(12) United States Patent
Hruska et al.

(10) Patent No.: US 10,896,249 B2
(45) Date of Patent: Jan. 19, 2021

(54) SECURE ELECTRONIC AUTHENTICATION OF A USER ON AN ELECTRONIC DEVICE

(71) Applicant: TARGET BRANDS, INC., Minneapolis, MN (US)

(72) Inventors: Timothy Hruska, Maple Grove, MN (US); Dhilli Prasad Nellepalli, Minnetonka, MN (US); Vishal Patil, Edina, MN (US); Steve Bennett, Maple Grove, MN (US); Vijay Krishnamoorthy, Richfield, MN (US); Kevin Onken, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 232 days.

(21) Appl. No.: 16/119,076

(22) Filed: Aug. 31, 2018

(65) Prior Publication Data

US 2020/0074056 A1 Mar. 5, 2020

(51) Int. Cl.
*G06F 21/32* (2013.01)
*H04W 12/06* (2009.01)
*H04L 29/06* (2006.01)
*H04L 9/32* (2006.01)

(52) U.S. Cl.
CPC ............ *G06F 21/32* (2013.01); *H04L 9/3213* (2013.01); *H04L 9/3231* (2013.01); *H04L 63/108* (2013.01); *H04W 12/06* (2013.01)

(58) Field of Classification Search
CPC . G06F 21/32; H04W 12/06; H04W 12/00502; H04L 63/108; H04L 9/3213; H04L 9/3231; H04L 63/0807; H04L 63/0861; H04L 9/3234
See application file for complete search history.

(56) References Cited

U.S. PATENT DOCUMENTS

| | | | |
|---|---|---|---|
| 9,306,754 B2 | 4/2016 | Baghdasaryan et al. |
| 9,729,537 B2 | 8/2017 | McBride et al. |
| 9,832,185 B2 | 11/2017 | McMurtry et al. |
| 2005/0027605 A1 | 2/2005 | Chen et al. |
| 2012/0116897 A1 | 5/2012 | Klinger et al. |
| 2013/0166380 A1 | 6/2013 | Khalil |
| 2014/0007205 A1 | 1/2014 | Oikonomou |

(Continued)

*Primary Examiner* — Meng Li
(74) *Attorney, Agent, or Firm* — Hamre, Schumann, Mueller & Larson, P.C.

(57) ABSTRACT

A computer-implemented method of electronically authenticating an identity of a user of a mobile device is described. The method includes providing a mobile device application that a user can load onto a mobile device having a display screen and an input device, the mobile application permitting the user to electronically authenticate an identity of the user. A server receives authentication credentials from the mobile device. The server compares the authentication credentials as received with account credentials stored in a database accessible to the server. The server, based on the comparing, generates an authentication code in response to the authentication credentials as received matching with account credentials stored in the database. The server causes the application to display on the display screen of the mobile device an option to electronically authenticate using a biometric credential. The server receives a selection indicating acceptance of use of authenticating using the biometric credential.

15 Claims, 5 Drawing Sheets

(56) References Cited

U.S. PATENT DOCUMENTS

| | | |
|---|---|---|
| 2015/0100459 A1 | 4/2015 | Linden et al. |
| 2016/0300217 A1 | 10/2016 | Grabovski et al. |
| 2017/0011440 A1 | 1/2017 | Shauh et al. |
| 2017/0048233 A1* | 2/2017 | Khylkouskaya ...... H04L 63/083 |
| 2017/0053301 A1 | 2/2017 | Khan et al. |
| 2017/0061441 A1 | 3/2017 | Kamal et al. |
| 2017/0085563 A1* | 3/2017 | Royyuru ............ G06Q 30/0277 |
| 2017/0124632 A1 | 5/2017 | Godsey et al. |
| 2017/0250979 A1 | 8/2017 | Benson et al. |
| 2017/0257363 A1* | 9/2017 | Franke ................... H04L 63/18 |
| 2017/0323297 A1 | 11/2017 | Shanmugam |
| 2017/0330181 A1 | 11/2017 | Ortiz |
| 2018/0032996 A1 | 2/2018 | Phillips et al. |
| 2018/0040032 A1 | 2/2018 | Chalasani et al. |
| 2020/0228340 A1* | 7/2020 | Blackhurst .......... H04L 63/0861 |

\* cited by examiner

SECURE ELECTRONIC AUTHENTICATION OF A USER ON AN ELECTRONIC DEVICE

FIELD

This disclosure relates generally to systems and methods for electronically authenticating an identity of a user of an electronic device. More specifically, this disclosure relates to systems and methods for electronically authenticating the identity of the user when using a website or application on an electronic device.

BACKGROUND

Online shopping is a continuously growing industry. A user engaging in online shopping can locate potential products of interest in a number of ways, including by conducting Internet searching, via a social network, going directly to a website known by the user, via an application on a mobile device, or the like.

Improved ways to present products to a user for possible purchase are desirable.

SUMMARY

This disclosure relates generally to systems and methods for electronically authenticating an identity of a user of an electronic device. More specifically, this disclosure relates to systems and methods for electronically authenticating the identity of the user when using a website or application on an electronic device.

In an embodiment, a user can electronically authenticate her identity within an application using a biometric credential.

In an embodiment, a user can browse a website without providing authentication credentials. The user can add one or more items to a virtual shopping cart. In an embodiment, the user can exit the website, return at a later time, and review the one or more items previously added to the virtual shopping cart.

In an embodiment, a user shopping without providing authentication can log in to the website with authentication credentials to have the one or more items in the virtual shopping cart transferred to the authenticated user's virtual shopping cart.

A computer-implemented method of electronically authenticating an identity of a user of a mobile device is described. The method includes providing a mobile device application that a user can load onto a mobile device having a display screen and an input device, the mobile application permitting the user to electronically authenticate an identity of the user. A server receives authentication credentials from the mobile device. The server compares the authentication credentials as received with account credentials stored in a database accessible to the server. The server, based on the comparing, generates an authentication code in response to the authentication credentials as received matching with account credentials stored in the database. The server causes the application to display on the display screen of the mobile device an option to electronically authenticate using a biometric credential. The server receives a selection indicating acceptance of use of authenticating using the biometric credential.

A computer-implemented method of electronically authenticating a user without providing authentication credentials is also described. The method includes providing a website that a user can access via a mobile device having a display screen and an input device. The website permits the user to browse one or more items and add one or more of the one or more items to a virtual shopping cart. The method includes checking a token of a browser of the mobile device. In response to the checking, the method includes determining that a valid token is not present for the browser and generating a valid token for the browser.

A system is also described. The system includes a server having a processor and a memory; a communication network; and a database in electronic communication with the server via the communication network. The server is configured to provide a mobile device application that a user can load onto a mobile device having a display screen and an input device, the mobile application permitting the user to electronically authenticate an identity of the user. The server receives authentication credentials from the mobile device. The server compares the authentication credentials as received with account credentials stored in a database accessible to the server. The server, based on the comparing, generates an authentication code in response to the authentication credentials as received matching with account credentials stored in the database. The server causes the application to display on the display screen of the mobile device an option to electronically authenticate using a biometric credential. The server receives a selection indicating acceptance of use of authenticating using the biometric credential.

BRIEF DESCRIPTION OF THE DRAWINGS

References are made to the accompanying drawings that form a part of this disclosure, and which illustrate embodiments in which the systems and methods described in this Specification can be practiced.

Like reference numbers represent like parts throughout.

DETAILED DESCRIPTION

Figure 1:
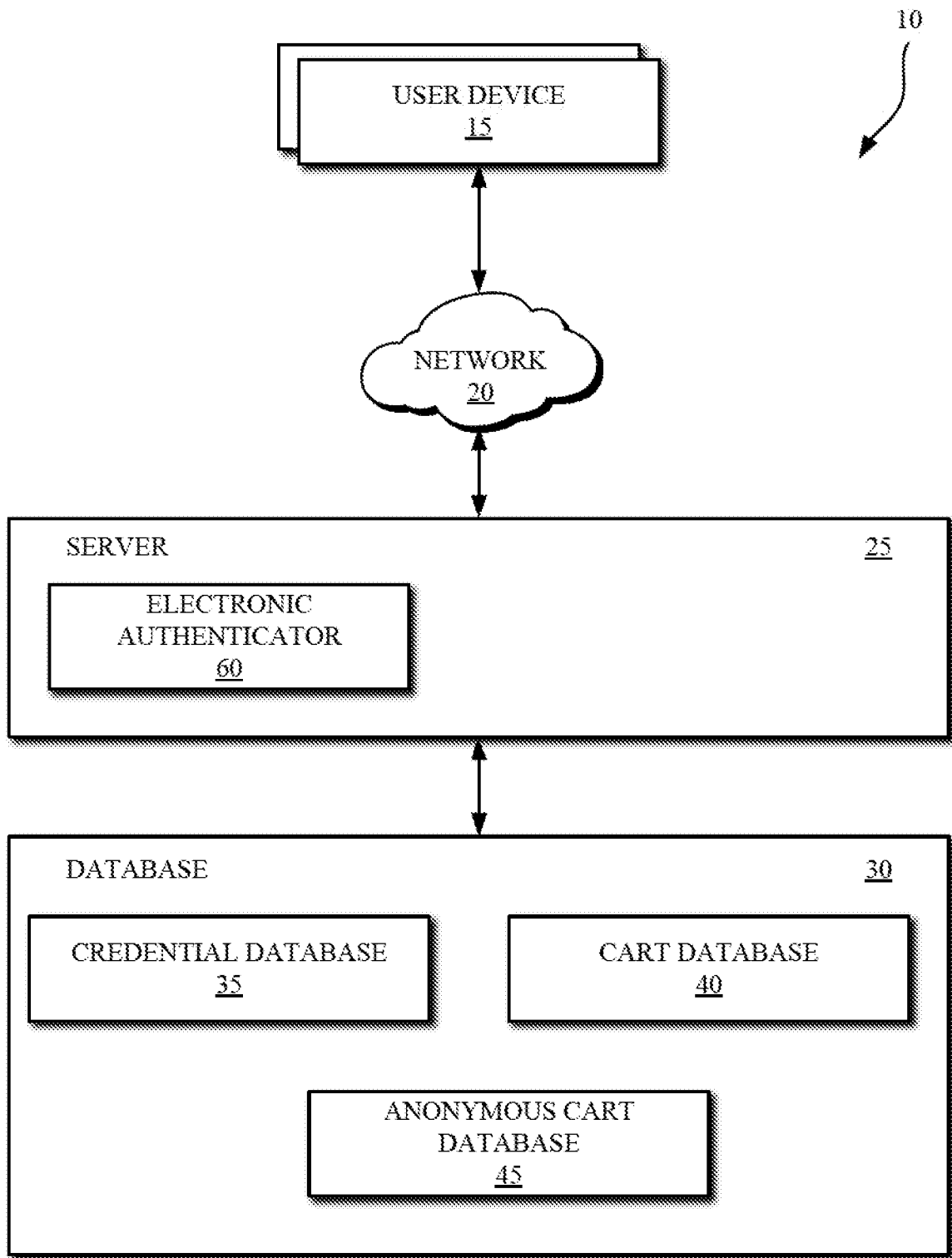
FIG. 1 is a schematic diagram of a system for implementing the electronic authentication systems and methods described in this Specification, according to an embodiment.

This disclosure relates generally to systems and methods for electronically authenticating an identity of a user of an electronic device. More specifically, this disclosure relates to systems and methods for electronically authenticating the identity of the user when using a website or application on an electronic device.

When using electronic devices, such as electronic mobile devices, a user can download an application for installation onto a memory of the mobile device. The application can include functionality that is accessible without electronically authenticating an identity of the user. The application can include functionality that is accessible after electronically authenticating the identity of the user.

In one example, a retailer may provide an application for a mobile device that enables a user to browse, select, and purchase one or more items that are available for sale by the retailer. In some cases, the user may be able to browse through the catalog of items and add items to a virtual shopping cart without electronically authenticating an identity of the user.

In other cases, the user may authenticate her identity to access some functionality of the application. For example, if the user has created a user account and stored one or more addresses (e.g., a shipping address, a billing address, etc.), payment methods, or the like, the user may need to authenticate to establish the user's identity prior to accessing this stored information. In such scenarios, users may enter the authentication credentials every time the user wishes to authenticate her identity (e.g., to make a new purchase, update the information or the like). In addition to being a potential source of frustration to the user, each time the authentication credentials are entered, there is a risk that a third party may be snooping for transmission of the authentication credentials over a network. Further, in some instances, the authentication credentials may be stored directly in the application, which can be accessed by an unauthorized party.

Improved methods for securely electronically authenticating an identity of a user of a mobile device are desired. Embodiments in this disclosure are directed to enabling a user to utilize biometric credentials stored by the mobile device.

In some mobile devices, a fingerprint can be used to access certain protected areas of the memory of the mobile device, certain settings of the mobile device, or the like. Such biometric credentials can be encrypted along with a unique hardware device identifier by the manufacturers of the mobile devices. These biometric credentials can be used to limit an amount of authentication credential sharing between a user of a mobile device and a server of, for example, a retailer.

In some mobile devices, facial recognition can be used to access certain protected areas of the memory of the mobile device, certain settings of the mobile device, or the like. Such biometric credentials can be encrypted along with a unique hardware device identifier by the manufacturers of the mobile devices. These biometric credentials can be used to limit an amount of authentication credential sharing between a user of a mobile device and a server of, for example, a retailer.

In an embodiment, the electronic authentication systems and methods described in this Specification can increase a security level of the application. In an embodiment, the electronic authentication systems and methods described in this Specification can reduce an overall number of times that authentication credentials such as, but not limited to, a username and password, are shared over a network between a mobile device and a server. In an embodiment, the electronic authentication systems and methods described in this Specification do not store authentication credentials of a user in an application stored on the mobile device. Accordingly, the methods and systems described herein can result in less opportunity for an unauthorized third party to obtain access to a user's authentication credentials.

The described systems and methods can be utilized in a retail setting, for example in a website or application that enables a user to browse, select, and purchase one or more items available for sale by a retailer.

As used herein, a "biometric credential" or "biometric credentials" can include one or more of a fingerprint, a facial recognition, an audible password, a passcode, or the like, that is associated with an electronic device.

As used herein, an "application" can include a program or piece of software designed and written to fulfill a particular purpose. As used herein, an "application" generally refers to an application for execution on an electronic mobile device such as, but not limited to, a smartphone, a personal digital assistant (PDA), a tablet-style device, a wearable mobile device (e.g., a smart watch, a head wearable device, etc.), or the like.

FIG. 1 is a schematic diagram of a system 10 for implementing the electronic authentication systems and methods described in this Specification, according to an embodiment.

The system 10 can generally enable a user to electronically authenticate her identity in a secure manner through an application using a biometric credential of a user device 15. In an embodiment, the system 10 can enable a user to browse a website using the user device 15 without providing authentication credentials. The user can add one or more items to a virtual shopping cart and, when the user exits the website and returns at a later time, the user can review the one or more items previously added to the virtual shopping cart. In an embodiment, the system 10 can be utilized by a retailer.

The system 10 includes a server 25 in electronic communication with a plurality of user devices 15 via a network 20. The server 25 includes an electronic authenticator 60 that can receive an authentication request from the user devices 15. The electronic authenticator 60 can validate authentication credentials received in the authentication request and issue a token or the like to the user devices 15. The electronic authenticator 60 can also receive a request to utilize a biometric credential and enable biometric authentication for the user devices 15. The electronic authenticator 60 can receive the authentication request and issue the token or the like via the network 20.

The server 25 can make a website with a graphical user interface (GUI) available to the user device 15. The server 25 can make the website available over the network 20 according to principles known in the art suitable for allowing a user to access and view the website with the user device 15. In an embodiment, aspects of the server 25 are the same as or similar to aspects of a server device 535 as described in accordance with FIG. 5 below.

In an embodiment, the network 20 may be representative of the Internet. In an embodiment, the network 20 can include a local area network (LAN), a wide area network (WAN), a wireless network, a cellular data network, suitable combinations thereof, or the like. Aspects of the network 20 can be the same as or similar to aspects of the network 540 as shown and described in accordance with FIG. 5 below.

Examples of the user devices 15 include, but are not limited to, a personal computer (PC), a laptop computer, a mobile device (e.g., a smartphone, a personal digital assistant (PDA), a tablet-style device, etc.), a wearable mobile device (e.g., a smart watch, a head wearable device, etc.), or the like. The user devices 15 generally include a display device and an input device. Examples of the display devices for the user devices 15 include, but are not limited to, a monitor connected to a PC, a laptop screen, a mobile device screen, a tablet screen, a wearable mobile device screen, or the like. Examples of the input devices for the user devices 15 include, but are not limited to, a keyboard, a mouse, a trackball, a button, a voice command, a proximity sensor, a touch sensor, an ocular sensing device for determining an input based on eye movements (e.g., scrolling based on an eye movement), suitable combinations thereof, or the like. Aspects of the user devices 15 can be the same as or similar to aspects of the user devices 501 as shown and described in accordance with FIG. 5 below.

The server 25 is in electronic communication with database 30. The database 30 can include a variety of data for purposes of electronically authenticating an identity of a user of the user device 15.

In an embodiment, the database 30 can include one or more databases. For example the database 30 shown in FIG. 1 can include a credential database 35, a cart database 40, and an anonymous shopping cart database 45. It will be appreciated that these databases are examples. Additional databases can be included. One or more of the databases can be combined into a single database. For example, in an embodiment, the credential database 35 and the cart database 40 can be combined into a single database (not shown). It will also be appreciated that the databases 35-45, or portions thereof, can be on separate computing devices.

The credential database 35 can store unique authentication credentials for user accounts of, for example, the retailer in the case that the system 10 is utilized by a retailer. For example, if users are generally authenticated via a combination of a username and a password, the credential database 35 can include a listing of usernames and associated passwords. The credential database 35 can be used to validate an entry of authentication credentials from the user device 15.

The cart database 40 can be used to store virtual shopping cart information. The cart database 40 can include a token identifier field that can be used to associate an entry with a particular token identifier, and accordingly, with a particular user that has obtained the token having the associated token identifier as generated by the electronic authenticator 60. The anonymous cart database 45 can a listing of virtual shopping cart information and token identifiers for users that are anonymously browsing through a website to manage the anonymous user's virtual shopping cart information.

It is to be appreciated that various roles of user devices 15, server 25, and database 30 may be distributed among the devices in the system 10. For example, the electronic authenticator 60 can be partially or entirely included on the user devices 15 in, for example, an application, or the like. Similarly, the database 30 can be maintained on the server 25.

Figure 2:
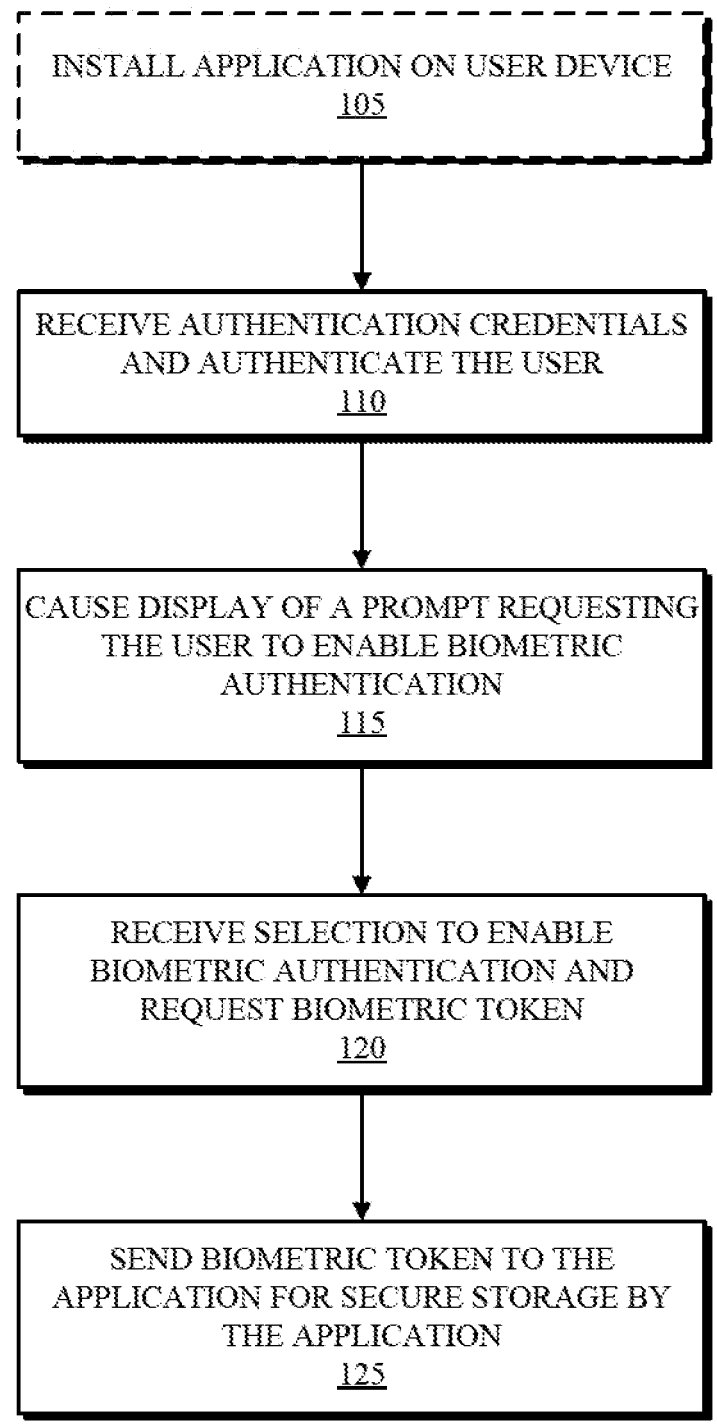
FIG. 2 is a flowchart of a method for initializing electronic authentication of an identity of a user, according to an embodiment.

FIG. 2 is a flowchart of a method 100 for initializing electronic authentication of an identity of a user, according to an embodiment.

The method 100 can generally be performed using the system 10 in FIG. 1. The method 100 generally enables a user to electronically authenticate her identity through a user interface of an application and utilize a biometric authentication of the user's identity following the initial electronic authentication to re-authenticate in certain situations. In an embodiment, the method 100 can be considered as a multi-part process that includes authentication and authorization. In general, the authentication process can include 110 and the authorization process can include 115-125.

At 105, a user can download and install an application (e.g., an application of a retailer) onto a user device (e.g., the user device 15 in FIG. 1). It will be appreciated that the step 105 may be executed at a different time than the remainder of the method 100. Accordingly, 105 is identified as being optional. It is to be appreciated that the application is to be installed prior to executing the remainder of the method 100.

At 110 a user can authenticate her identity by entering authentication credentials. In an embodiment, the authentication credentials include, but are not limited to, a username and a password associated with an account of the user. For example, in an embodiment in which the application is a user interface for a retailer that enables the user to browse, select, and purchase one or more items for sale by the retailer, the authentication credentials can include a username and a password that are associated with an account the user has registered with the retailer. It will be appreciated that at 110 the user may has an account already registered with the retailer. In an embodiment, the user may be able to create an account at 110.

At 110 a server (e.g., server 25 in FIG. 1) receives the request to electronically authenticate the user's identity via the authentication credentials and validates whether the authentication credentials (e.g., username and password) match authentication credentials stored in a database (e.g., credential database 35 in FIG. 1). In an embodiment, an electronic authenticator (e.g., the electronic authenticator 60 in FIG. 1) of the server 25 can perform the validation by comparing the user's username with the entries in the credential database 35 and the password with the corresponding password entry of the username in the credential database 35.

If the server 25 is unable to identify matching authentication credentials (e.g., there is no corresponding username in the credential database 35), the server 25 can send a message to the user device 15 via the network 20 that causes the application to display an error message on the user device 15.

If the server 25 identifies a partial match of the authentication credentials (e.g., a correct username but incorrect password in the credential database 35), the server 25 can send a message to the user device 15 via the network 20 that causes the application to display an error message on the user device 15.

If the server 25 identifies a match of the authentication credentials (e.g., the username and corresponding password match an entry in the credential database 35), the server can send an authentication code to the user device 15. If the user device 15 already has an authentication code, the authentication code can be sent to the server 25 via the network 20 (FIG. 1). The authentication code can be validated according to a database. If the authentication code is valid, then the server 25 can generate and provide a token to the application.

The token can have an expiration date. If the expiration date is reached, then a new token will be generated in response to again receiving entry of the authentication credentials of the user. The token enables use of the application for a period of time (e.g., until the expiration date is reached) without the user again entering her authentication credentials. For example, the user may be able to use the application, including features that require authentication, for the next eight hours after receiving the token. It will be appreciated that 8 hours is intended to be an example, and that the expiration date of the token can vary according to the principles described herein.

In an embodiment, a single token can be generated. In an embodiment, multiple tokens can be generated. The token can be stored in secure memory associated with the application on the user device 15. The authentication credentials of the user (e.g., username and password, etc.) are not stored in the secure memory associated with the application. By not retaining a copy of the authentication credentials, a security of the authentication method can be increased as the application may be less vulnerable to exposing sensitive information if the user device 15 is compromised (e.g., hacked or otherwise accessed without proper authority). It will be appreciated that the token is encrypted to prevent unauthorized access to the token.

At 115, the user can be prompted to enable biometric authentication within the application. If the user enables biometric authentication, the server 25 may add an association between the biometric authentication information and the token information in the database (e.g., in the credential database 35 in FIG. 1).

In an embodiment, enabling biometric authentication can extend the expiration period of the token received by the application. For example, in an embodiment, enabling biometric authentication can extend a validity period of the token to be 180 days (instead of the previously set 8 hours). It will be appreciated that this time period can vary according to the principles described herein.

At 120, the server 25 receives an indication that the user has chosen to enable biometric authentication. It will be appreciated that if the user has not selected to use biometric authentication, the method 100 may stop after 115. At 120, the server 25 can generate a biometric token for the user device 15.

At 125, the server 25 sends the biometric token to the application for secure storage by the application.

Figure 3:
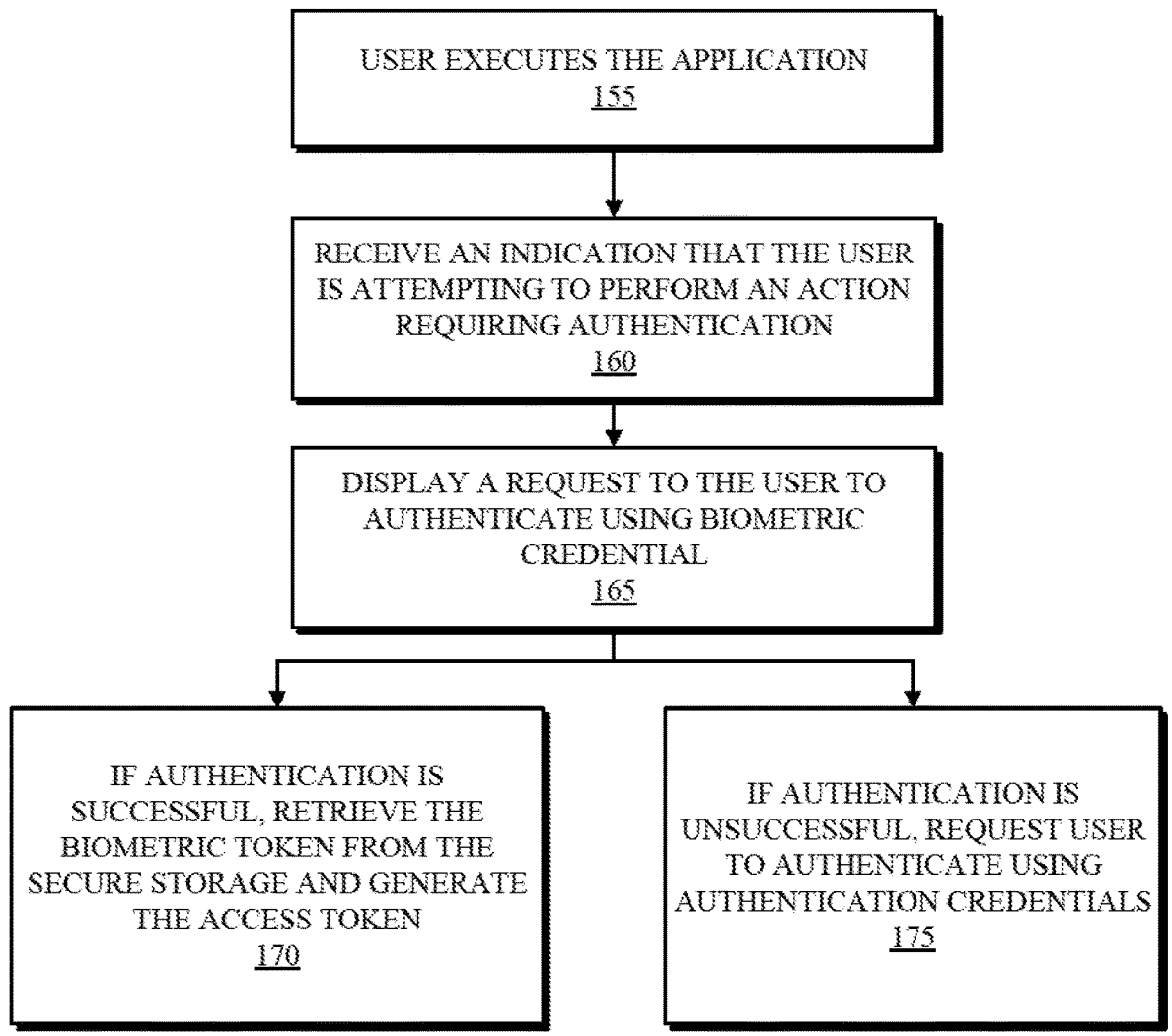
FIG. 3 is a flowchart of a method for electronically authenticating an identity of a user, according to an embodiment.

FIG. 3 is a flowchart of a method 150 for electronically authenticating an identity of a user, according to an embodiment.

The method 150 generally is executed when a user who has electronically authenticated her identity uses a functionality of the application that my require authorization.

At 155, the user may execute the application on the user device 15. At 160, a server (e.g., the server 25 in FIG. 1) can receive an indication that the user is attempting to perform an action that requires authentication of the identity of the user. For example, the user may have selected to complete a purchase; modify one or more settings in a user profile of the user; or the like.

At 165, the application can display a request to the user to authenticate her identity using a biometric credential. It will be appreciated that the particular biometric credential may be based on, for example, the user's particular device, one or more settings of the user's device, or the like.

If authentication is successful, at 170 the biometric token will be retrieved from secure storage of the user device and the access token will be generated by the electronic authenticator 60 and sent to the server 25.

If authentication is unsuccessful, at 175 the application can display a request to the user to enter her electronic authentication credentials (e.g., username and password). That is, if the biometric authentication is unsuccessful, then the method 150 may perform a similar authentication to the authentication at 110 in method 100 (FIG. 2).

Figure 4:
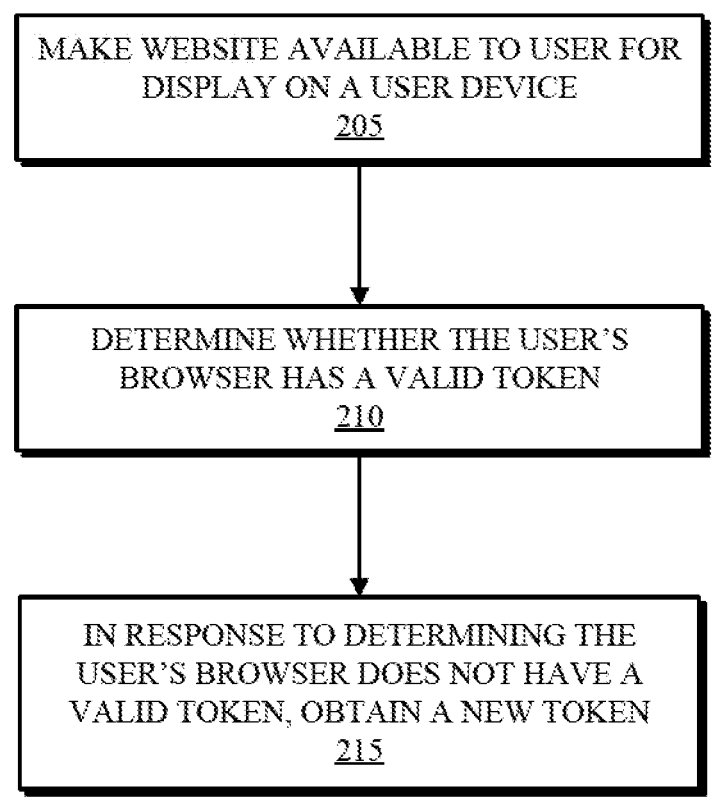
FIG. 4 is a flowchart of a method for electronically retaining a virtual shopping cart without electronic authentication of an identity of a user, according to an embodiment.

FIG. 4 is a flowchart of a method 200 for electronically retaining a virtual shopping cart without electronic authentication of an identity of the user, according to an embodiment. The figure is generally described with respect to browsing a website. It will be appreciated that the method is also applicable to an application, such as an application on a mobile device.

The method 200 generally enables a user to browse a website (e.g., the website of a retailer) without providing authentication credentials. The user can add one or more items to a virtual shopping cart. In an embodiment, the user can exit the website, return at a later time, and review the one or more items previously added to the virtual shopping cart even without authenticating through the website.

At 205, a website (e.g., the website of a retailer) is loaded and displayed on a user device (e.g., the user device 15 in FIG. 1). At 210, a check is performed to determine whether a valid token of the website is stored by the browser on the user device 15. The check can be performed on the user side, according to an embodiment. At 215, if no valid token is identified, a new token can be generated. The new token can enable tracking of contents within a cart for an expiration period of the token (e.g., a time period in which the token is valid). For example, the new token can be valid for approximately 180 days. It will be appreciated that this duration is an example and the actual value can vary beyond the stated value. In an embodiment, the token for the anonymous user can have a random identifier that creates a placeholder for an account. In an embodiment, if the user chooses to enter her authentication credentials, the anonymous shopping cart may be associated with the user's account, and the token associated with the random identifier may be cleared.

The method 200 can generally be performed every time a user visits the website of the retailer. In an embodiment, the validity duration of the token can be updated every time the user visits the website. For example, if the user visits the website and receives a token that is valid for the next 180 days and visits the website again after 10 days, the token may have its duration refreshed so that the token is valid for another 180 days from the date of the visit instead of the remaining 170 days. In an embodiment, the token may not be updated every time the user visits the website.

Figure 5:
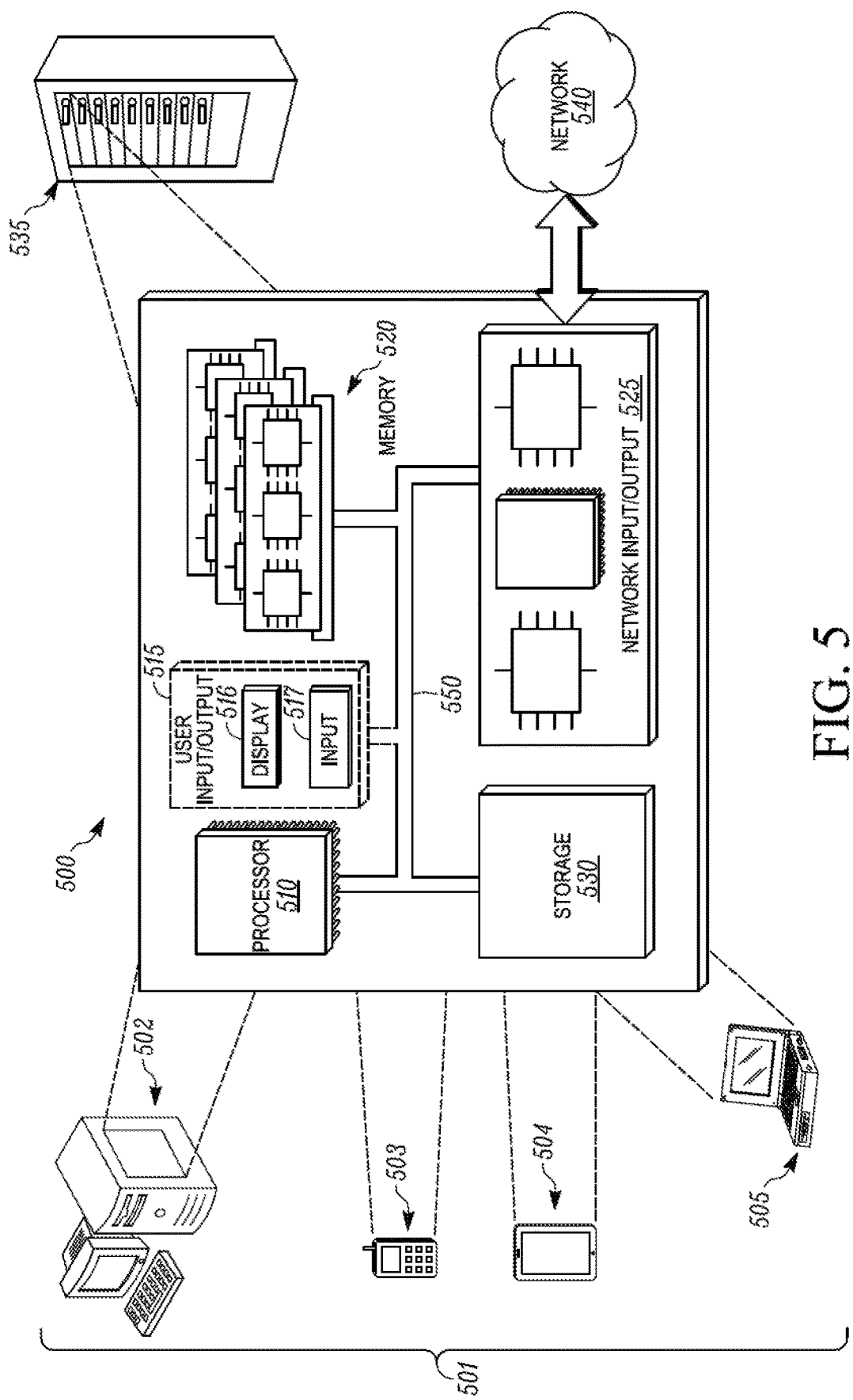
FIG. 5 is a schematic diagram of architecture for a computer device, according to an embodiment.

FIG. 5 is a schematic diagram of architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a wearable device, a personal digital assistant (PDA), a video game console, a television, or the like. In an embodiment, the user devices 501 can alternatively be referred to as client devices 501. In such an embodiment, the client devices 501 can be in communication with the server device 535 through the network 540. One or more of the client devices 501 can be in communication with another of the client devices 501 through the network 540 in an embodiment.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can be, for example, one or more busses or the like. The processor 510 can be a single processor, multiple processors, or a single processor having multiple processing cores. In some embodiments, the processor 510 can be a single-threaded processor. In an embodiment, the processor 510 can be a multi-threaded processor.

The user I/O 515 can include a display 516 and/or an input 517, according to an embodiment. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In an embodiment, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In an embodiment, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or input means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using Wi-Fi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

An embodiment can be provided to an end-user through a cloud-computing infrastructure. Cloud computing generally includes the provision of scalable computing resources as a service over a network (e.g., the Internet or the like).

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A computer-implemented method of electronically authenticating an identity of a user of a mobile device, the mobile device including a mobile device application that a user can load onto the mobile device having a display screen and an input device, the mobile device application being a user interface for a retailer that enables the user to browse, select, and purchase one or more items for sale by the retailer and permitting the user to electronically authenticate an identity of the user, the method comprising:
   receiving, by a server, authentication credentials from the mobile device that are associated with an account the user has registered with the retailer;
   comparing, by the server, the authentication credentials as received with account credentials stored in a database accessible to the server;
   based on the comparing, generating an authentication code in response to the authentication credentials as received matching with account credentials stored in the database;
   upon validation of the authentication code, sending an authentication token that is encrypted from the server to the mobile device via a network for storage in a secure memory of the mobile device associated with the user interface for the retailer, wherein the authentication token has a first expiration period;
   causing the user interface for the retailer to display on the display screen of the mobile device an option to electronically authenticate using a biometric credential;
   receiving, by the server, a selection indicating acceptance of use of authenticating using the biometric credential; and
   upon the server receiving the selection indicating acceptance of use of authenticating using the biometric credential:
      adding an association between biometric authentication information from the biometric credential and information stored in the database regarding the authentication token, and
      extending an expiration period of the authentication token from the first expiration period to a second expiration period that is longer than the first expiration period;
   wherein the second expiration period date is refreshed automatically when the user interface is accessed by the user prior to the second expiration period date,
   wherein the authentication credentials are not stored in the secure memory of the mobile device associated with the mobile device application, and
   wherein the authentication token enables use of the user interface for the retailer on the mobile device without the user entering the authentication credentials until one of the first expiration period and the second expiration period.

2. The computer-implemented method according to claim 1, wherein the biometric credential includes one or more of a fingerprint recognition and a facial recognition.

3. The computer-implemented method according to claim 1, further comprising accessing the authentication token in response to validating the biometric credential of the user.

4. A system, comprising:
   a server having a processor and a memory;
   a communication network; and
   a database in electronic communication with the server via the communication network, wherein the server is configured to:
      provide a mobile device application that a user can load onto a mobile device having a display screen and an input device, the mobile device application permitting the user to electronically authenticate an identity of the user, wherein the mobile device application is a user interface for a retailer that enables the user to browse, select, and purchase one or more items for sale by the retailer;
      receive, by a server, authentication credentials from the mobile device that are associated with an account the user has registered with the retailer;
      compare, by the server, the authentication credentials as received with account credentials stored in the database accessible to the server;
      based on the comparison, generate an authentication code in response to the authentication credentials as received matching with account credentials stored in the database;
      upon validation of the authentication code, send an authentication token that is encrypted from the server to the mobile device via a network for storage in a secure memory of the mobile device associated with the user interface for the retailer, wherein the authentication token has a first expiration period;
      cause the user interface for the retailer to display on the display screen of the mobile device an option to electronically authenticate using a biometric credential;
      receive, by the server, a selection indicating acceptance of use of authenticating using the biometric credential; and
      upon the server receiving the selection indicating acceptance of use of authenticating using the biometric credential:
         add an association between biometric authentication information from the biometric credential and information stored in the database regarding the authentication token, and
         extend an expiration period of the authentication token from the first expiration period to a second expiration period that is longer than the first expiration period;
      wherein the second expiration period is refreshed automatically when the user interface is accessed by the user prior to the second expiration period,
      wherein the authentication credentials are not stored in the secure memory of the mobile device associated with the mobile device application, and
      wherein the authentication token enables use of the user interface for the retailer on the mobile device without the user entering the authentication credentials until one of the first expiration period and the second expiration period.

5. The system according to claim 4, wherein the biometric credential includes one or more of a fingerprint recognition and a facial recognition.

6. The computer-implemented method according to claim 1, wherein the first expiration period is eight hours and the second expiration period is 180 days.

7. The system according to claim 4, wherein the first expiration period is eight hours and the second expiration period is 180 days.

8. The computer-implemented method according to claim 1, further comprising:
   the server receiving an indication that the user is attempting to perform an action on the user interface that requires authentication of an identity of the user;

causing the user interface to display a request to the user to authenticate the identity of the user; and the server generating an access token upon successful authentication that provides access to the user to perform the action.

9. The computer-implemented method according to claim 8, wherein the action is one of completing a purchase from the retailer on the user interface, and modifying a setting in a user profile of the user on the user interface.

10. The system according to claim 4, wherein the server is configured to:

receive an indication that the user is attempting to perform an action on the user interface that requires authentication of an identity of the user;

cause the user interface to display a request to the user to authenticate the identity of the user; and generate an access token upon successful authentication that provides access to the user to perform the action.

11. The system according to claim 10, wherein the action is one of completing a purchase from the retailer on the user interface, and modifying a setting in a user profile of the user on the user interface.

12. The computer-implemented method according to claim 1, further comprising:

checking for the authentication token; and in response to the checking, determining that the authentication token is not present and generating a new authentication token that enables tracking of contents within a virtual shopping cart on the user interface of the retailer.

13. The computer-implemented method according to claim 12, wherein checking the authentication token includes determining whether the authentication token is present, and in response to determining the authentication token is present, determining whether the authentication token is expired.

14. The system according to claim 4, wherein the server is configured to:

check for the authentication token; and in response to the checking, determine that the authentication token is not present and generate a new authentication token that enables tracking of contents within a virtual shopping cart on the user interface of the retailer.

15. The system according to claim 14, wherein to check the authentication token includes the server being configured to determine whether the authentication token is present, and in response to determining the authentication token is present, determine whether the authentication token is expired.

\* \* \* \* \*